April 7, 1970  J. TYMKEWICZ  3,504,544
TEMPERATURE INDICATING MEANS FOR FOOD PREPARATION
Filed July 22, 1968
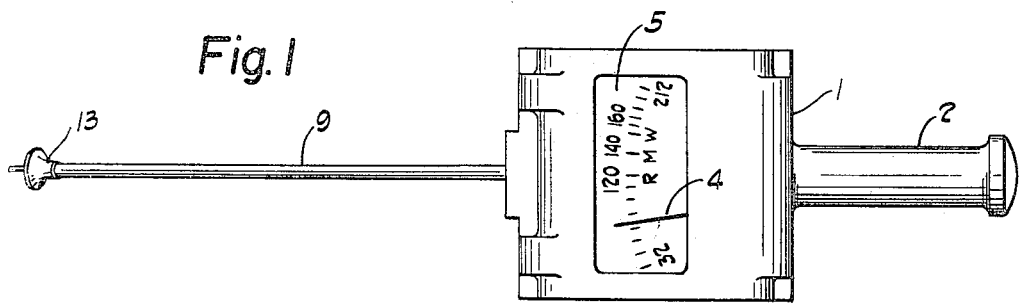
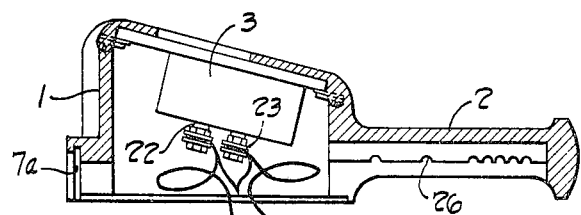
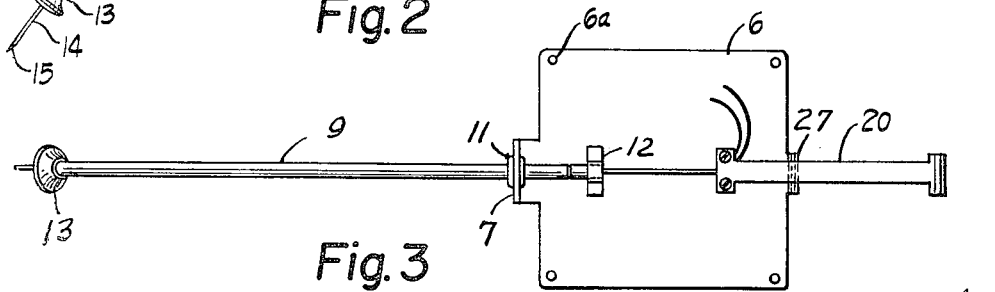
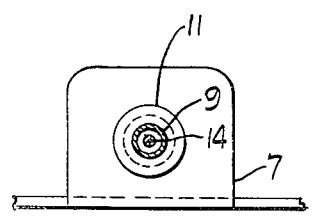
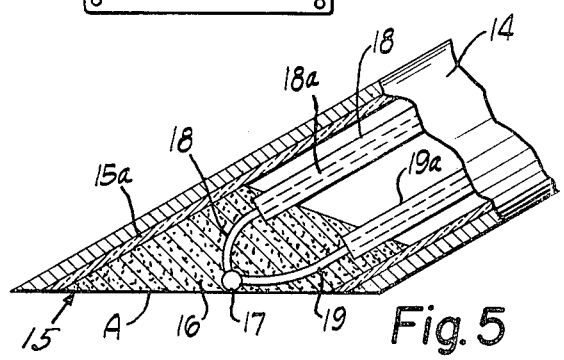
INVENTOR.
J. TYMKEWICZ
BY Robb & Robb
Attorneys

United States Patent Office 3,504,544
Patented Apr. 7, 1970

3,504,544
TEMPERATURE INDICATING MEANS FOR
FOOD PREPARATION
John Tymkewicz, 4159 W. Valley Drive,
Fairview Park, Ohio 44126
Filed July 22, 1968, Ser. No. 746,646
Int. Cl. G01k 1/08
U.S. Cl. 73—352     4 Claims

ABSTRACT OF THE DISCLOSURE

A device for indicating the temperature of food during its preparation, which indicates the internal temperature of the food. Effective indication and cooking to almost a specified condition is possible, since the indicating means are embodied in a probe, having a penetrating portion adapted to be adjustable into and out of a penetrating position, manipulation of the probe being possible from the handle of the probe, at which location the temperature is ascertained. The probe may be positioned at any place within the food being cooked irrespective of the size or form of such food. The penetrating portion of the probe is a sharpened device of hypodermic-like construction so as to furnish temperature indication in a precise area over a relatively wide range of penetration depth.

---

With the foregoing in mind, it is a primary object of this invention to provide a temperature indicating device which transmits the temperature of food being cooked to a dial from within various parts of the food, whereby consistent and thorough cooking may be effected almost to specification particularly after initial determination of the results which may be attained has been made and thereafter provided as a sort of formula to follow.

It is particularly an object of this invention to provide for the indication of the temperature of meat during cooking since the taste of various persons varies so widely and by appropriate indication cooking to taste may be effected since the probe and specifically the temperature indicating portion thereof may be inserted in the meat to any desired depth consistently, in a manner to ascertain the changes which take place and the time when the meat is cooked to the selected condition in a roast or even in a thin steak which will vary from one piece of meat to another in superficial appearance and texture.

A further object of the invention is to provide a temperature indicating means which will be portable, simple in construction, selectively indicative of conditions and relatively inexpensive in manufacture to enable the used to more consistently cook food which is not only palatable, but which is to be cooked to taste under varying conditions.

A very important object of the invention is to provide means which will enable the determination of the condition of food being cooked in an electronic oven, for example, or where the food is being prepared using infrared radiation and where otherwise usual visual observation does not reflect the actual condition which is desired to be produced and indicate the temperature as well as potential flavor of such food.

Specific objects of the invention are to provide a hand-held device wherein a probe member is provided which is extensible and retractable by manipulation of a control therefor, the probe member being of hypodermic-like construction incorporating a thermocouple, a thermister or a diode or comparable devices which will produce a temperature indication at a dial for the purposes hereof.

A further specific object of the invention is to provide an indicating device and incorporate in a housing comprising the same, a meter in which indicia are incorporated and so located that indication of temperature is disclosed thereon, and transmitted thereto from a remote area and specifically in a probe member which in turn is moved in and out of a fixed arm and through a stop or shoe so as to regulate the depth of penetration of such member, and thereby in turn indicate the condition at various points within the food being cooked, whether the same be meat, vegetable or other such food.

An even more specific object of the invention is to provide a probe member of novel configuration and construction which includes a penetrating portion having provision for producing what is in effect a surface temperature indication, but actually is translated into area indication where the surface is within the food being cooked, providing for an infinite series of indications by adjustment over a wide range for the purposes hereof.

Other and further objects of the invention will be understood from a consideration of the specification appended hereto and shown in the drawings, wherein:

FIGURE 1 is a front view, partly fragmentary, indicating the housing for the device and the dial and indicia thereon with relationship of other elements of the device being disclosed.

FIGURE 2 is a sectional view showing the cover by which the probe means are carried, partly removed or spaced from the housing in which the meter is located in order to more clearly illustrate the actual construction of the device.

FIGURE 3 is a bottom view of the cover and its associated parts.

FIGURE 4 is a view taken about on the line 4—4 of FIGURE 2 looking in the direction of the arrows.

FIGURE 5 is an enlarged fragmentary view illustrating the penetrating portion of the probe member and thermocouple section therewithin.

FIGURE 6 is an enlarged fragmentary view illustrating a modification of the probe adjusting means.

Referring now to FIGURES 1 and 2, the device hereof is shown as including a housing generally indicated at 1, from which extends a handle 2 which in this instance is integral with such housing, the housing being interiorly open so as to support therewithin a meter 3 which includes a pointer 4 thereon adapted to move over the face of a dial 5, which dial includes certain indicia thereon more particularly to be described hereinafter.

Adapted to be emplaced on the housing 1, is a cover 6 which is generally flat and substantially rectangular in configuration as indicated in FIGURE 3, including at one end an upwardly extending ear 7, and opposite thereto and substantially similarly arranged, another ear 8.

The ear 7 supports a fixed arm 9 which is a hollow tubular member having preferably a long bend at 10, the arm 9 passing through a rubber grommet 11 positioned in a suitable opening in the ear 7, the arm 9 extending into or within the area of the cover 6, and being fastened by a clamp member 12 so that the arm is maintained in the position disclosed with respect to the cover 6. The part 12 is clampingly engaged with the end of the fixed arm 9 to maintain the position shown.

At the opposite end of the arm 9 is a stop 13 which may be of suitable plastic material, frictionally positioned on the end of said arm, and arranged to be held against a piece of meat, for example, for purposes which will be understood as this description proceeds.

Mounted within the fixed arm 9, is a probe member 14, which is the size of a large hypodermic needle, hollow and flexible which probe member includes a penetrating portion 15 at its extremity, more particularly disclosed in FIGURE 5 as being angularly cut with respect to the axis of such penetrating portion.

The penetrating portion 15, reference being had to FIGURE 5, is angularly cut as indicated, to provide a relatively greater area than would be the case if the portion was merely sliced in a plane perpendicular to the axis, so that the effect of temperature directed to such surface is collected and may be imparted to a temperature sensitive element 17, which may be a thermocouple junction or a thermister, diode or comparable device which is composed of a material or compound which changes its resistance due to a temperature change.

In the case of a thermocouple junction, wires 18 and 19 may be copper and constantan respectively, or in the case of a thermister or diode or comparable device, appropriately insulated wire will be supplied, the insulation being indicated at 18a and 19a respectively.

In order to position the temperature sensitive element 17 within the area of the end or face of the portion 15, a suitable thermal conductive cement or compound 16 may be placed therein, approximately 3/64" in thickness, and embedding the wires 18 and 19 as well as the insulation portions 18a and 19a thereof, therewithin.

This end of the portion 15 has been previously internally coated at 15a with a thermal insulating coating approximately .005 and .010 inch in thickness so that the penetrating portion itself, being of metal, will not conduct the heat from wide areas in the food being tested, to the face A of the portion 15 and thereby be reflected in a false indication of the temperature at or substantially at the surface provided by the face of the conductive cement or compound 16.

This probe member 14 is preferably of stainless steel and relatively small diameter, as for example about .072 inch in diameter, extending through the fixed arm 9 as previously described, to a position within the area of the cover 6, and connected to an operating handle 20 in any suitable manner, as by soldering or otherwise, so that reciprocation of the handle 20 will in turn cause the probe member 14 to move inwardly and outwardly within the fixed arm 9.

The wires 18 and 19 respectively in turn extend from the element 17 interiorly of the needle 14 to the meter 3, being connected thereto at 22 and 23 respectively.

The operating handle 20 is a member of flexible form, provided at its extremity with a notch engaging portion 24 from which an offstanding handpiece 25 extends.

The portion 24 as shown in FIGURE 2, is adapted to engage a series of notches 26 formed in the handle means 2 previously refered to so that the penetrating position of the probe portion may be varied and maintained in the said position when extended or retracted to permit the probe to be inserted in the food or withdrawn therefrom during manipulation for temperature indicating purposes.

The ear 8 includes at its extremity, a friction piece 27 to engage the surface of the operating handle 20 whereby in conjunction with the notches 26 such handle will be retained in such position flexing thereof being necessary for adjustment.

Since it may be desired to have a somewhat greater range of movement of the probe member 14, and particularly the penetrating portion 15 thereof, a modified form of construction of this handle 20 is shown in FIGURE 6, comprising a shorter handle portion indicated at 20a to which is affixed a post 20b which post in turn, extending at right angles as indicated, is provided with a threaded stud 20c which in turn extends through a slot 6a in cover 6. A suitable knob 20d is threadedly engaged with the stud 20c and by suitable manipulation of such knob, fix the operating handle 20a in an infinite number of positions along said slot as will be readily understood. This will prevent the penetrating portion 15 of the probe from being accidentally moved or displaced when a certain desired depth of penetration has been established.

FIGURE 1 is again referred to at this point, since it discloses the dial 5 previously mentioned with the indicating pointer or needle 4 positioned to move thereover, such dial being divided into Fahrenheit degree increments beginning at 32 degrees and extending to 240 degrees, for example, so that the needle in sweeping over such dial in response to the transmission of indication thereto from the penetrating portion 15 of the probe member 14 will give indication of the temperature at such penetration depth and specifically in what amounts to a surface type of indication at such portion.

Where the device is used in ascertaining the condition of meat, an area in the meat cooking range is selected which may be described as from 120 to 160 degrees, for example, where the meat at a temperature of 120 degrees would be rare, varying degrees of rarity being defined up to the point of being well-done at 160 degrees.

Where the device is used for temperature indication of foods of other types, such as fowl for example, the indicating portion will be inserted at a joint or other place which has been found to be indicative of the condition thereby producing such indication for consideration of the user.

It should be emphasized at this point that the ability to variably position the probe is important since it can thereby be ascertained the varying conditions of meat from the center thereof, for example, in a steak to the outermost surface which will disclose the condition if it is desired to have a predetermined degree of cooking repeated.

The use of the device in the cooking of vegetables will be apparent, since the probe when the particular area of the penetrating portion 15 thereof is inserted in a potato for example, and it has been ascertained that the potato has been cooked at a certain temperature, it can be determined whether it is in fact cooked at that temperature.

This ability to ascertain temperatures whether the same be the temperature of liquids such as gravies, vegetables or otherwise is particularly important where electronic cooking means are resorted to and where time is critical in such cooking. Ordinary meat thermometers cannot be used in such ovens, but this indicating device can be so used, and since it provides an almost instantaneous indication, the time element is taken into account.

It cannot be emphasized too much, that the ability to adjust the tip or penetrating portion 15 facilitates the indication of temperatures at various depths of insertion into meat, although the effect or result produced is as though a surface temperature probe was being used by reason of the construction thereof.

Where infra-red radiation is used and thus color is affected, the advantages of the instant device will be apparent, since accuracy will result and uniformity possible as desired.

I claim:

1. In an indicating device of the class described, in combination, a housing, temperature indicating means in said housing, probe means extending from said housing, said probe means including a fixed arm, a probe member reciprocably mounted with respect to said arm for movement inwardly and outwardly with respect thereto, said member having a food penetrating portion extensible from said arm, a temperature sensitive element in said penetrating portion, connections from said element extending to and connected with said indicating means whereby the temperature of food in which the penetrating portion is inserted will be transmitted to said indicating means, the fixed arm is tubular, the probe means is a small diameter tube having a diagonally cut end comprising the food penetrating portion, said tube being positioned for movement within the fixed arm, and the temperature sensitive element extends within the small diameter tube to a position adjacent said diagonally cut end, and said small diameter tube is connected to an operating handle arranged to provide for extending and retracting of said tube within the fixed tubular arm.

2. The combination as claimed in claim 1 wherein the food penetrating portion of the tube is provided with a thermally insulated coating, and the temperature sensitive element is embedded in a thermally conductive compound, suitable connections extending from said temperature sensitive element to the indicating means within the housing.

3. The combination as claimed in claim 1 wherein the fixed arm includes a stop member at its extremity.

4. The combination as claimed in claim 1 wherein handle means extend from the housing, said handle means including a series of positioning portions, an operating handle is connected to the probe member, said operating handle being engageable with the positioning portion to position and maintain the end of the small diameter tube in various positions with respect to the stop member.

References Cited

UNITED STATES PATENTS

| | | | |
|---|---|---|---|
| 2,154,426 | 4/1939 | Adams | 73—352 |
| 2,422,124 | 6/1947 | Obermaier | 73—359 XR |
| 2,816,997 | 12/1957 | Conrad. | |
| 2,967,428 | 1/1961 | Burgert | 73—352 |

LOUIS R. PRINCE, Primary Examiner

F. SHOON, Assistant Examiner